United States Patent [19]

Lodetti

[11] 4,431,896

[45] Feb. 14, 1984

[54] METHOD AND APPARATUS FOR ORIENTING THE WIRE GUIDANCE HEADS ON SPARK EROSION CUTTING EQUIPMENT FOR ERODING WITH A GREAT WIRE SLOPE

[75] Inventor: Attilio Lodetti, Losone, Switzerland

[73] Assignee: A.G. für industrielle Elektronik AGIE, Losone, Switzerland

[21] Appl. No.: 212,727

[22] PCT Filed: Apr. 22, 1980

[86] PCT No.: PCT/CH80/00047

§ 371 Date: Dec. 26, 1980

§ 102(e) Date: Oct. 31, 1980

[87] PCT Pub. No.: WO80/02395

PCT Pub. Date: Nov. 13, 1980

[30] Foreign Application Priority Data

Apr. 26, 1979 [CH] Switzerland .................. 3930/79

[51] Int. Cl.³ .................. B23P 1/12; B23P 1/04
[52] U.S. Cl. .................. 219/69 W; 219/69 G
[58] Field of Search .................. 219/69 G, 69 W, 69 R, 219/68, 69 C

[56] References Cited

U.S. PATENT DOCUMENTS

| | | | |
|---|---|---|---|
| 3,731,044 | 5/1973 | Ullmann et al. | 219/69 W |
| 3,849,624 | 11/1974 | Dulebohn et al. | 219/69 W |
| 4,205,212 | 5/1980 | Ullmann et al. | 219/69 W |

FOREIGN PATENT DOCUMENTS

| | | | |
|---|---|---|---|
| 594477 | 9/1977 | Switzerland | 219/69 W |
| 1182749 | 3/1970 | United Kingdom | 219/69 W |

Primary Examiner—M. H. Paschall
Attorney, Agent, or Firm—Frishauf, Holtz, Goodman & Woodward

[57] ABSTRACT

To permit machining of workpieces on spark erosion cutting equipment with large angles of inclination, the guidance heads which guide the wire electrode in the cutting zone with respect to the workpiece are pivotably arranged and controlled, by being mounted on individual gimbal suspensions so that it is possible to provide for a controllable slope angle up to large amounts. Individual drive motors control movement about the respective gimbal axes.

10 Claims, 6 Drawing Figures

METHOD AND APPARATUS FOR ORIENTING THE WIRE GUIDANCE HEADS ON SPARK EROSION CUTTING EQUIPMENT FOR ERODING WITH A GREAT WIRE SLOPE

The invention relates to an apparatus making it possible to work on workpieces on spark erosion cutting equipment with a substantial slope angle, and more particularly to the positioning of guidance heads guiding the wire electrode in the cutting zone relative to the workpiece suitable guidance heads are shown in patents assigned to the assignee of this application, namely Swiss No. 594,477, and its corresponding U.S. Pat. No. 4,205,212, Ullmann et al, of May 27, 1980.

BACKGROUND

Spark erosion cutting with numerical digital control of guidance of a wire electrode was originally introduced for making prismatic openings in workpieces. However, manufacturing problems frequently occur in making of cutting tools and in connection with sintered and extrusion dies where conically profiled blind surfaces or openings for stamping and punching are required in addition to a cylindrical opening. To avoid idle time and changing to other operating equipment it is necessary to seek a way in which this work can also be carried out on a single spark erosion cutting apparatus with only one work clamping operation. The angular slopes can be 45° and more, so that the conventional wire guide means used on existing equipment cannot be directly employed, because when the wire electrode passes out of such a guidance means with such a large inclination, notch effects and increased abrasion on the wire result which can lead to inadmissible fluctuations in wire stress and to bending which cause permanent plastic deformation in the wire.

The presently known equipment for carrying out conical spark erosion cutting with a wire electrode preferably use small slope angles, of approximately less than 2° and therefore only have control processes permitting the guidance of the displacement of the upper wire guidance device relative to the lower wire guidance device by small amounts V. There can be both a polar and a Cartesian guidance of the coordinates and the particular displacement amount V and its direction can either be set in a fixed manner (see German Pat. No. 2,155,622 and corresponding U.S. Pat. No. 3,830,996) or can be derived mathematically from digital control and adjusted continuously tangentially to control the instantaneous cutting direction (see Swiss Pat. No. 515,693 and corresponding U.S. Pat. No. 3,731,045 and Swiss Pat. No. 513,694 and corresponding U.S. Pat. No. 3,731,043). These publications describe accessories for mounting on existing machines, as well as devices which are integrally incorporated into the machines and in which the arms carrying the guidance heads are correspondingly moved (see German Patent disclosure document DE-OS No. 2,255,429). The guidance means of these devices cannot be oriented in relation to the slope of the wire and as a result large slope or inclination settings are not possible. It is known to use guidance means such as e.g. drawing dies or rollers in which the lateral removal angles can be larger than usual. However, in this case, the contact point of the trailing arc of the guidance means is displaced, so that on changing the conicity it is necessary to accept fluctuations regarding the machining geometry, and a degradation of precision. The resulting workpiece geometry errors may become so large that they cannot normally be accepted in tool construction. An example of this type is contained in Swiss Pat. No. 486,288 in which the signals for the conical regulating motors are obtained from the scanning of a template.

To obtain greater slope angles of the wire electrode, it has been proposed to fix the upper and lower wire guides to a common support and pivoting the latter by control devices (see German Patent Disclosure Document DE-OS No. 2,644,369). Quite apart from the difficult gimbal movement mounting of such a support and the limited range of adjusting the working height between the two guide heads, such a solution has the disadvantage that when inclined, the support may collide with the workpiece. It is not possible to adjust the height of the cone center position for a conical cut with respect to the workpiece. Another solution of this type is shown in East German Pat. No. 115,444.

A third construction type is known in which the workpieces are mounted on a gimbal suspension and are pivoted to bring about larger angles (see German Patent Disclosure Document DE-OS No. 2,401,424). However, since the workpieces generally have much larger dimensions than the almost dimensionless wire electrode, the design of a gimbal suspension for the suspension for the workpieces always involves a considerable machine construction expenditure. In addition, when a large workpiece is inclined, the pivoting movement of the outer workpiece portions can lead to collisions with the machine structure or the guidance arms, which must otherwise be set to particularly wide guidance distances. Thus, e.g. for an angular setting of 30° at only 200 mm from the machining center, the pivoting stroke is already 100 mm (sine 30°=0.5).

THE INVENTION

It is an object to provide for adjustability of the wire guidance without space being lost due to the resulting pivoting in the machining area. In addition, through the individual adjustability of the lower wire guide relative to the upper guide, a possibility of control of the relative position of the cone center of the conical setting with respect to the workpiece to be machined is obtained.

Briefly, the wire guidance heads themselves are adjustably mounted by a gimbal-suspension on respective support arms in such a way that the inlet or outlet points of the wire with respect to the guidance means in the heads are in the gimbal movement center.

An example for such a complete guidance head is shown in U.S. Pat. No. 4,205,212, Ullmann et al, assigned to the assignee of this application to which Swiss Pat. No. 594,477 corresponds. The orientation of the guides, for cutting profiles and controlling the setting thereof can either be carried out with mechanical or electromechanical or purely electronic positioning devices.

Figure 1:
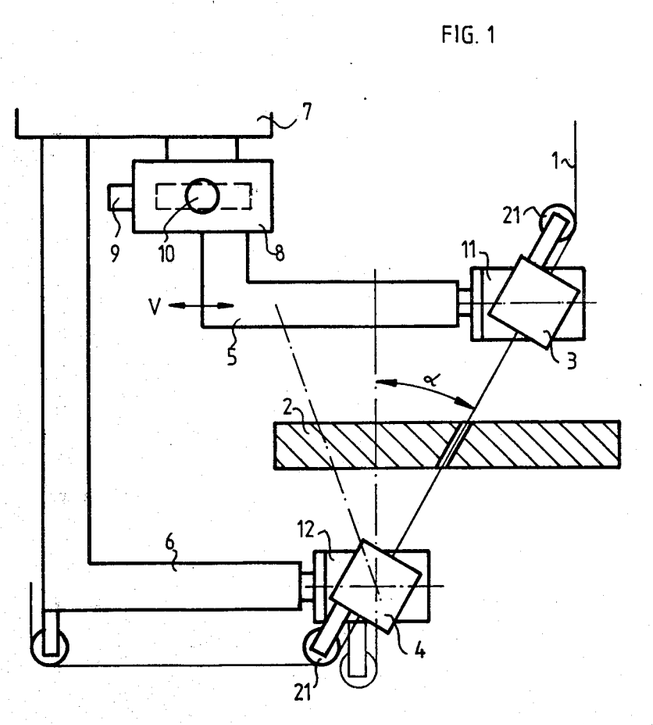
FIG. 1 is a schematic side view of the arrangement of the orientable wire guidance heads in the working zone of a spark erosion apparatus.

FIG. 1 is a diagrammatic fragmentary cutaway view of the working zone of a spark erosion cutting installation with a wire electrode 1 and workpiece 2. The wire electrode is guided by means of guidance heads 3 and 4 with respect to the workpiece in a commanded position. The guidance heads are located on support arms 5, 6 fixed to the machined frame, schematically shown at 7. The upper wire guidance arm 5 is mounted on a coordinate slide 8, in this case in the form of a Cartesian coordinate system, having respective motors 9 and 10. Arm 5 thus can be adjusted relative to frame 7 within the scope of the adjustment range of the coordinate slide 8, so that the upper guide head 3 assumes a position relative to the lower guide head 4 required for inclined guidance of the wire in the workpiece. The slope angle of the wire relative to the workpiece is measured by comparison with vertical, axial running direction of the wire and is designated α. It is obvious that during actual machining, the wire electrode is moved. clamping means—not shown—are provided for the workpiece 2 to affix the workpiece with respect to the machine coordinate table. The wire guidance heads 3 and 4 are fixed by a gimbal suspension 11, 12 to arms 5 and 6. According to the invention they can therefore be pivoted into the inclined position with the angle α. Details of this process will be explained relative to FIG. 2, being identical for both the upper and lower guidance arms and need only be arranged mirror-reversed.

Figure 2:
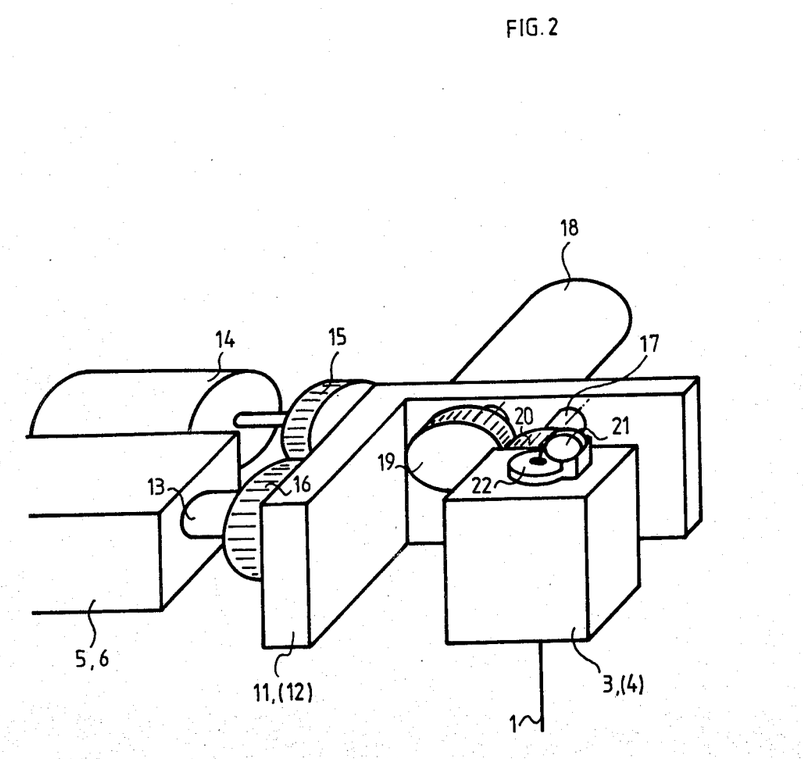
FIG. 2 is a perspective view of the gimbal suspension for the guidance head on a guidance arm with motor pivot drive.

FIG. 2 shows at 5, 6 the end portion of the machine arm carrying the guidance heads to which the latter are fixed in the gimbal suspension 11, 12 for wire heads 3, 4. This suspension initially comprises a pivot pin 13 pivotably and frontally mounted in the end piece of the arm 5, 6 and which can be pivoted about a bearing by a variable speed motor 14 which drives a pinion 15 mounted on the motor shaft engaging a gear wheel 16 which is fixed to the pivot pin 13. Guidance heads 3, 4 are rotatably fixed on a bracket and mounted by pivot pin 17 in a plane perpendicular to the first bearing on the gimbal suspension 11, 12. Here again, the pivoting drive uses a variable speed motor 18 with a pinion 19 mounted on its motor shaft and a gear wheel 20 which is fixed to the pivot pin. The level of the pivot planes of pins 13 and 17 is constructionally such that they are placed in the plane where the wire electrode 1 in guidance heads 3 and 4 passes out of the wire guidance means therein. Thus, when carrying out the pivoting movement, there is no positional change of the outlet point, other than the said pivotal movement. In order that the wire electrode can readily be supplied from its supply or discharge side to the wire guidance heads, it is necessary to provide an additional guide pulley 21 on the corresponding side which rotates about the wire axis on a support 22 and which is automatically oriented according to any adopted inclined position. On setting the arrangement to α=0°, the running direction of the wire electrode 1 is exactly perpendicular to the plane fixed by the movement axes of pivot pins 13 and 17. The variable speed motors 14 and 18 are provided with digital control, receiving movement information with respect to a clearly defined angular position, which is mathematically determined by the amount of angle α and the position of the instantaneous cone center with respect to the workpiece. These calculations are determined in the same way as the calculation of the displacement of the upper guide relative to the lower guide in Cartesian or polar coordinate systems, see Swiss Pat. No. 513,694 and Swiss Pat. No. 513,693.

Figure 3A:
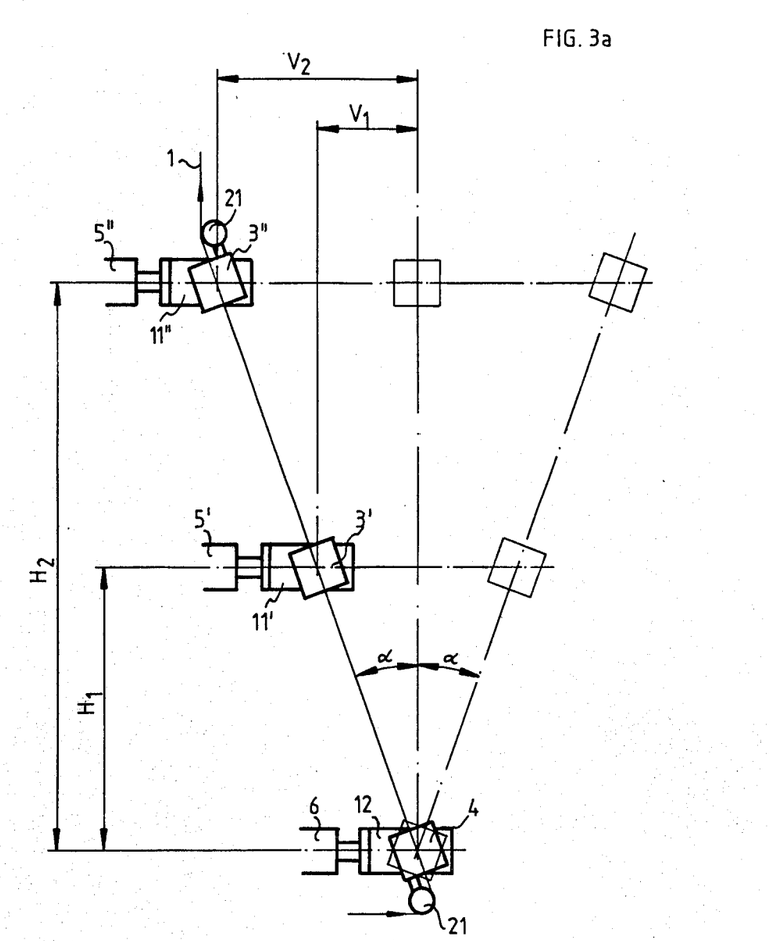
FIGS. 3a and 3b are diagrammatic explanations of the different requirements on the pivotal movement of the guidance heads as a function of the setting of the machining height and the position of the instantaneous cone center.

It is apparent from FIG. 3a that in the case of differently set distances between guidance heads 3 and 4, i.e. with corresponding distance H1 and H2 between support arms 5 and 6, the pivoting angle of guidance heads 3 and 4 is always the same as the slope angle α of the wire electrode. This also means that the extent of pivoting of the guidance heads will differ for different cut heights relative to the displacements—V1 or V2—of guidance head 3 compared with guidance head 4.

Figure 3B:
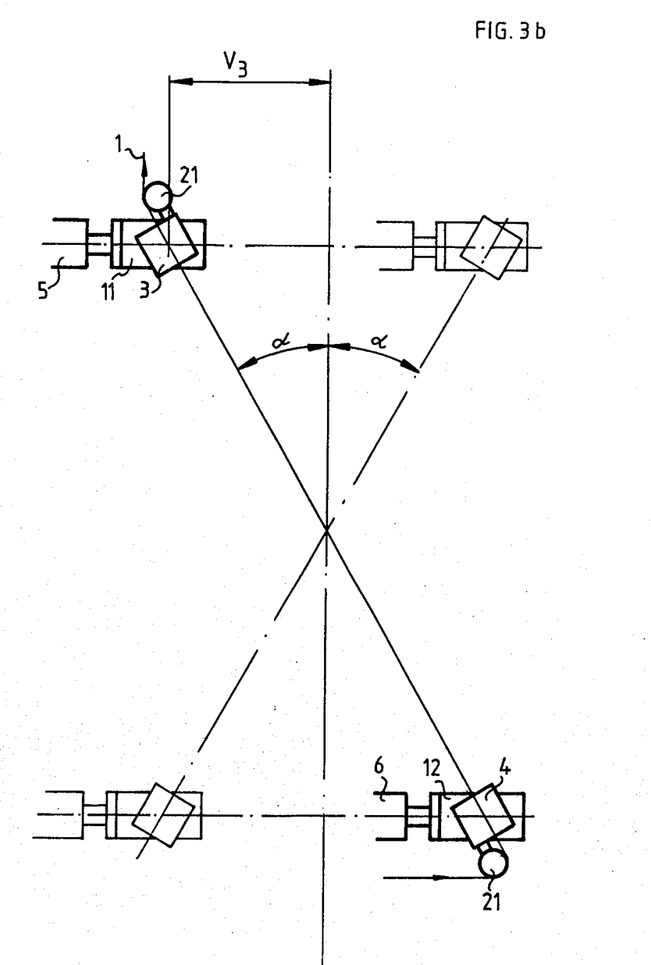

FIG. 3b shows a case where the center point for the cone settings of electrode 1 is not at one of the guidance heads 3, 4 but is, instead, located between one of the guides. In this case, the lower guide 4, on its arm 5, is additionally moved out of the center line axis for the cylindrical cutting position. It is immediately apparent that the pivoting angle α for the guidance heads for the displacement V3 must again assume a different relationship compared with the cases described in FIG. 3a.

Figure 4:
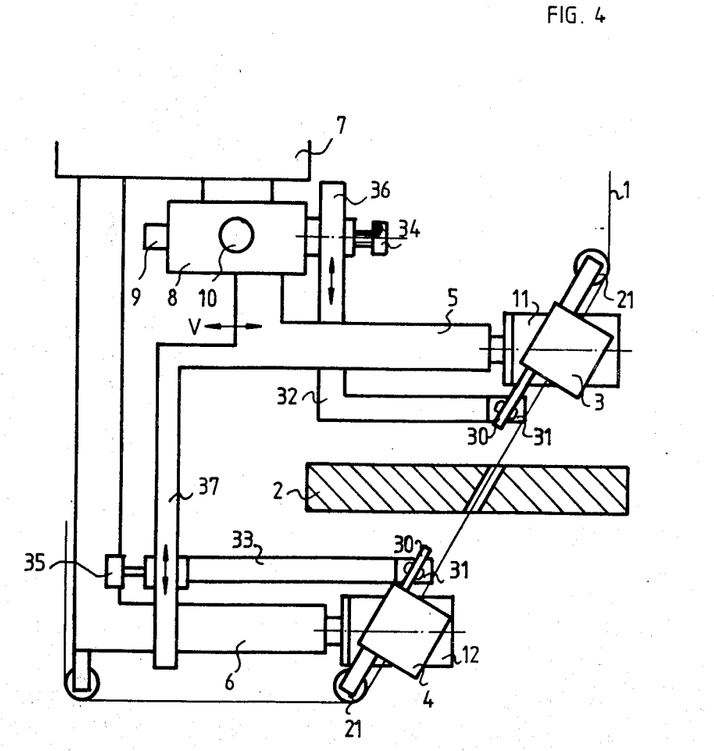
FIG. 4 is a side view of a mechanical pivoting drive for the guidance heads at the top and bottom.

FIG. 4 shows a purely mechanical solution for orientation of the wire guidance heads. The same references as in FIG. 1 are used for similar elements. A deflecting lever 30 is supported in an adjusting lever 32, 33 respectively by means of a spherical bearing 31; lever 30 supports the wire guidance heads 3, 4. For adjusting the pivot angle the two adjusting levers are adjustable to different leverage ratios in relation to the relative displacement V between the guidance heads. They are, respectively, secured to a mounting support 36, 37 by means of set screws 34, 35. The mounting support for the upper guidance arm can itself be moved in the coordinate slide 8, whilst the mounting support 37 of the fixed lower arm is fixed to the movable upper support arm 35. Motors 9, 10 permit adjusting the relative displacement of the upper guidance head with respect to the lower guidance head in the full machining plane, by means of supports 36, 37 and adjusting levers 32, 33. The deflection of the guidance heads is determined by the set transmission ratio which is automatically brought about. Adjustment movement of the respective levers is shown by the double arrows in FIG. 4.

Figure 5:
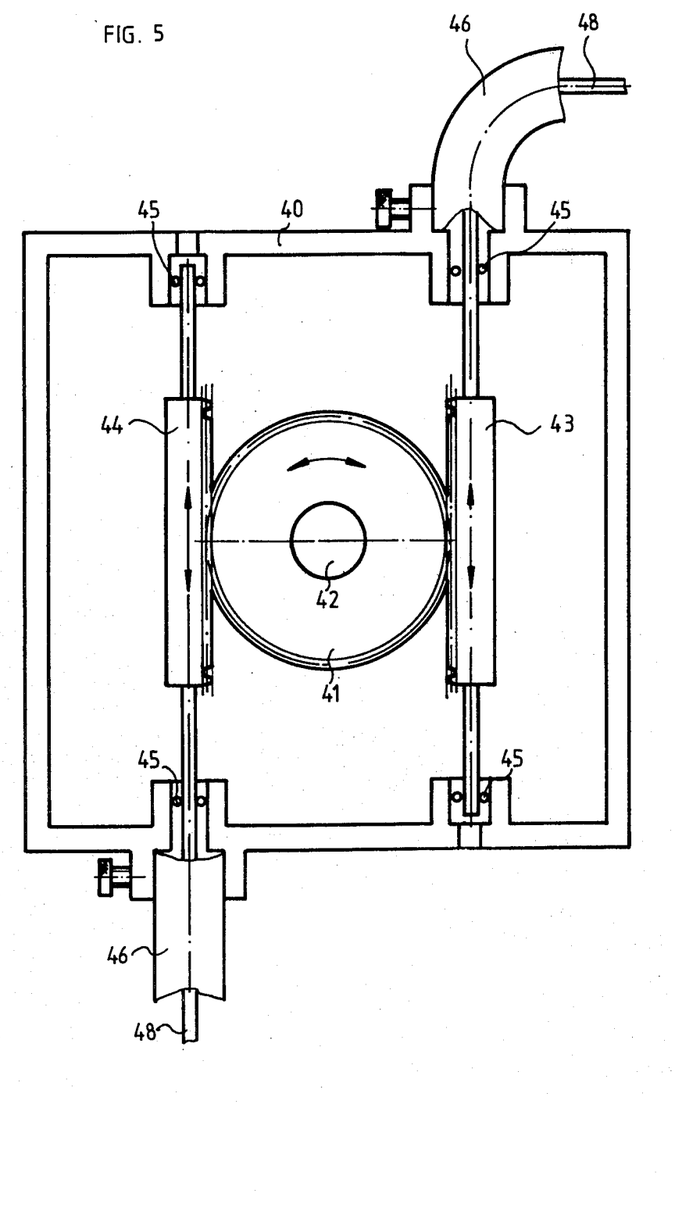
FIG. 5 is a schematic side view of an electromechanical drive of the upper and lower guidance heads derived from the drive elements for axial adjustment in Cartesian coordinates.

FIG. 5 shows an electromechanical alternative. Disturbing linkage arrangements in the working zone, are replaced by flexible cables to provide the drive for the pivoting movement and form bendable push/pull means. A small gear arrangement 40 is mounted on the driving motors for the relative displacement between the upper and lower guides 9, 10. Gearing arrangement 40 includes a pinion 41 on motor shaft 42. On operating the motor for displacing the guidance heads, a rack 43, 44 is moved by rotation of the pinion 41 and is directly coupled to the push/pull means, which consequently transfer its displacement via the flexible drive device to the upper and lower guidance heads. In accordance with FIG. 2 the displacement movement is transferred to the gear wheels 20 for one shaft or gear wheels 16 for the other shaft by means of racks. To ensure that the sliding movement is sufficiently easy, the racks are axially easily movable in bearings 45 and a flexible spacer tube 46 is guided around the push/pull means to ensure precision. The spacer tube is provided as a support on the guidance heads between the driving point and the driven point. To adjust the transmission ratio between the displacement movement and the pivoting points of the guidance heads, the gear ratio between the rack and pinion can be modified either in gearing arrangement 40 or on the guidance heads by gear wheels 20 and 16.

I claim:

1. Spark erosion apparatus to cut, by spark erosion, a deformation into a workpiece (2) having
   a cutting wire electrode (1);
   an upper wire guidance head (3);
   a lower wire guidance head (4),
   the workpiece (2) being positioned between the upper and lower guidance heads;
   an upper support arm (5) supporting the upper guidance head and being movable, with respect to the workpiece, in an upper coordinate plane;
   a lower support arm (6) supporting the lower guidance head and being movable, with respect to the workpiece, in a lower coordinate plane independently of the upper support arm;
   and comprising, in accordance with the invention
   at least one gimbal suspension (11, 12) secured to and movably, tiltably securing at least one guidance head (3, 4) on, and with respect to the associated support arm (5, 6) and having orthogonal gimbal axes, said orthogonal axes intersecting at a transition point;
   means (21) secured to the at least one head and guiding the wire in a path between the outside of the at least one head remote from the workpiece and through said transition point;
   and independently controllable drive means (14, 18) coupled to said at least one gimbal suspension and individually controlling the position of the at least one head with respect to each one of the respective orthogonal gimbal axes.

2. Apparatus according to claim 1 wherein the drive means are controlled electric motors;
   and gearing means (15, 16, 20, 21) coupled between the respective motors and the respective heads to move the respective heads about two individually controllable orthogonal gimbal axes.

3. Apparatus according to claim 1 wherein said apparatus includes a frame (7);
   said drive means is an electric motor mounted on the frame;
   and a lever-and-linkage system (31, 32, 34, 35, 36, 37) coupled to the motor and to said at least one head and, respectively, moving said head in the respective gimbal axes.

4. Spark erosion apparatus to cut, by spark erosion, a deformation into a workpiece (2) having
   a cutting wire electrode (1);
   an upper wire guidance head (3);
   a lower wire guidance head (4),
   the workpiece (2) being positioned between the upper and lower guidance heads;
   an upper support arm (5) supporting the upper guidance head and being movable, with respect to the workpiece, in an upper coordinate plane;
   a lower support arm (6) supporting the lower guidance head and being movable, with respect to the workpiece, in a lower coordinate plane independently of the upper support arm;
   and comprising, in accordance with the invention
   two gimbal suspensions (11, 12), secured respectively to the upper and lower guidance heads (3, 4) and to said respective heads to movably tiltably couple the respective heads to the respective support arms (5, 6), said gimbal suspensions each having orthogonal gimbal axes which intersect at a transition point;
   means (21) secured to the respective heads and guiding the wire in a path between the outside of the heads, remote from said workpiece, and through said transition point;
   and individually controllable drive means (14, 18) coupled to each of the gimbal suspensions, and individually controlling the position of the respective head with respect to each one of the respective orthogonal gimbal axes.

5. Apparatus according to claim 4 wherein the drive means are controlled electric motors:
   and gearing means (15, 16, 20, 21) coupled between the respective motors and the respective heads to move the respective heads in two individually controllable orthogonal gimbal axes.

6. Apparatus according to claim 4 wherein said apparatus includes a frame (7);
   said drive means are electric motors mounted on the frame;
   and a lever-and-linkage system (31, 32, 34, 35, 36, 37) coupled to the motors and to said heads and, respectively, moving said heads in the respective gimbal axes.

7. Apparatus according to claim 4 wherein said apparatus includes a frame (7);
   the individually controllable drive means comprises electric motor means (9, 10):
   and flexible push/pull cable means connecting the motor means to the respective heads and providing for movement of said heads about the respective gimbal axes.

8. Apparatus according to claim 6 wherein said lever-and-linkage means coupled to the upper and lower heads are interconnected to provide for conjoined movement of the respective heads upon repositioning of said linkage means.

9. Apparatus according to claim 10 further including coupling gearing means (41-44) connecting the respective flexible push/pull means of the upper and lower heads for conjoined movement of the upper and lower heads about respective gimbal axes.

10. Spark erosion apparatus to cut, by spark erosion, a deformation into a workpiece (2) having
    a cutting wire electrode (1);
    an upper wire guidance head (3);
    a lower wire guidance head (4),
    the workpiece (2) being positioned between the upper and lower guidance heads;
    an upper support arm (5) supporting the upper guidance head and being movable, with respect to the workpiece, in an upper coordinate plane;
    a lower support arm (6) supporting the lower guidance head and being movable, with respect to the workpiece, in a lower coordinate plane independently of the upper support arm;
    and comprising, in accordance with the invention
    at least one gimbal suspension (11, 12) secured to and movably, tiltably securing at least one guidance head (3, 4) on, and with respect to the associated support arm (5, 6) and having orthogonal gimbal axes, said orthogonal axes intersecting at a transition point;

means (21) secured to the at least one head and guiding the wire in a path between the outside of the at least one head remote from the workpiece and through said transition point;

and individually controllable drive means (14, 18) coupled to said gimbal suspensions, comprising electric motor means (9, 10) and flexible push/pull cable means connecting the motor means to the at least one head and providing for movement of said at least one head about the respective gimbal axes, for individually controlling the position of the at least one head with respect to each one of the respective orthogonal gimbal axes.

* * * * *